(12) United States Patent
Li

(10) Patent No.: US 12,461,213 B2
(45) Date of Patent: Nov. 4, 2025

(54) CALIBRATION OF A LIDAR SENSOR

(71) Applicant: Locus Robotics Corp., Wilmington, MA (US)

(72) Inventor: Changchun Li, Concord, MA (US)

(73) Assignee: Locus Robotics Corp., Wilmington, MA (US)

( * ) Notice: Subject to any disclaimer, the term of this patent is extended or adjusted under 35 U.S.C. 154(b) by 1142 days.

(21) Appl. No.: 17/380,136

(22) Filed: Jul. 20, 2021

(65) Prior Publication Data

US 2023/0034492 A1 Feb. 2, 2023

(51) Int. Cl.
*G01S 7/497* (2006.01)
*G01S 17/931* (2020.01)
(52) U.S. Cl.
CPC .......... *G01S 7/4972* (2013.01); *G01S 17/931* (2020.01)
(58) Field of Classification Search
CPC ........ G01S 7/497; G01S 7/4972; G01S 17/46; G01S 17/88; G01S 17/931; G01S 7/48; G01S 7/4802; G01S 17/06; G01S 17/93
See application file for complete search history.

(56) References Cited

U.S. PATENT DOCUMENTS

| | | | |
|---|---|---|---|
| 2021/0134079 A1* | 5/2021 | Nee | B65G 47/80 |
| 2021/0192788 A1* | 6/2021 | Diederichs | G01S 17/931 |
| 2022/0342055 A1* | 10/2022 | Katou | G01S 7/4972 |

FOREIGN PATENT DOCUMENTS

| | | | |
|---|---|---|---|
| KR | 2021140863 A | * 11/2021 | |
| WO | 2021/098608 A1 | 5/2021 | |
| WO | WO-2021140863 A1 | * 7/2021 | ............. G01S 17/06 |

OTHER PUBLICATIONS

European Patent Office, International Search Report and Written Opinion of the International Searching Authority, Application No. PCT/US2022/037445, dated Oct. 26, 2022, 15 pages.
Matthew Antone et al. *Fully Automated Laser Range Calibration*, Proceedings of the British Machine Vision Conference 2007, University of Warwick, UK, Sep. 2007, DOI: 10.5244/C.21.66, 10 pages.
Eung-su Kim et al. *Extrinsic Calibration between Camera and LiDAR Sensors by Matching Multiple 3D Planes*, Sensors 2020, 20, 52, Dec. 20, 2019, https://doi.org/10.3390/s20010052 , 17 pages.

* cited by examiner

*Primary Examiner* — Yuqing Xiao
(74) *Attorney, Agent, or Firm* — Sunstein LLP

(57) ABSTRACT

A system for determining pose of a lidar sensor in an environment in order to calibrate the lidar sensor. The system includes at least two calibration boards, each having a first edge and a second edge. There is a controller coupled to the lidar sensor to cause the lidar sensor to direct a lidar scan at the calibration boards. The controller causes the lidar sensor to receive a reflection of the lidar scan from the calibration boards and determine locations of a first crossing point on the first edge and a second crossing point on the second edge of the calibration boards. The controller determines a reference plane defined by the first and second crossing points of each of the calibration boards, performs a plane transform of the reference frame to obtain a lidar sensor plane and determine from the lidar sensor plane a pose of the lidar sensor.

18 Claims, 5 Drawing Sheets

CALIBRATION OF A LIDAR SENSOR

TECHNICAL FIELD

The present invention relates to calibration of a lidar sensor and more particularly to calibration of a lidar sensor mounted on vehicle, such as an autonomous mobile robot, using a plurality of calibration boards to determine the plane of a lidar sensor's scan relative to the plane of the vehicle associated with such lidar sensor.

BACKGROUND ART

Autonomous vehicles may use lidar sensors as part of their navigation systems for obstacle detection and avoidance to navigate safely through environments. Lidar is a method for determining ranges by targeting objects with a laser and measuring the time for the reflected light to return to the receiver. The lidar sensor may continuously scan the environment, typically in single plane, and the output, in the form of a 2-dimensional point cloud, provides the necessary data to determine where potential obstacles exist in the environment and where the vehicle is in relation to those potential obstacles. The output may also be used to determine the location, or pose, of the robot in the environment. The combination of position and orientation of the vehicle (or any object) is referred to as the pose.

In order to provide accurate data for navigation, the lidar sensor's position must be fixed and stable. However, when used for vehicle navigation, over time, the sensor may be prone to movements caused by vehicle travel over irregularities in the surface of the environment in which the vehicle travels, general wear and tear, and other movement causing events. Even when initially affixed to a vehicle, lidar sensors may have manufacturing issues that affect the angle or location of the emitted and/or received lidar pulses that affect the lidar sensor's accuracy. Therefore, initially and over time, calibration of the lidar sensor is important to ensure that accurate sensor readings are obtained.

In one method of calibration, the lidar sensor is calibrated using a photo camera having a known pose. Both the camera and the lidar sensor are calibrated with the same calibration targets. Then, a transform from the known camera frame to the lidar frame is determined. This transform shows the relative position of the lidar and can be used to calibrate the lidar data relative to the plane of the camera.

In another calibration method, complex calibration targets are designed in the form a square room with a diagonally oriented, square-shaped pillar extending across the room. This design provides multiple lines to measure a plane upon, one on each side of the square pillar and two in the back of the room.

These calibration rooms are generally large, bulky, difficult to transport, and expensive. Using the photo camera calibration approach comes with a lot of the same negatives and it is also hard to know the exact pose of the camera.

Therefore, it would be advantageous to develop a simpler, less expensive, and more readily portable system and method of calibrating the lidar sensor.

SUMMARY OF THE EMBODIMENTS

In accordance with one embodiment of the disclosure, there is a system for determining a pose of a lidar sensor in an environment in order to calibrate the lidar sensor. The system includes at least two calibration boards, each calibration board having a first edge and a second edge. There is a controller, coupled to the lidar sensor, which is configured to cause the lidar sensor to direct a lidar scan at the calibration boards to cross the first and second edges of each of the at least two calibration boards and to cause the lidar sensor to receive a reflection of the lidar scan from the calibration boards. Responsive to the reflection of the lidar scan, the controller determines locations of a first crossing point on the first edge and a second crossing point on the second edge of each of the at least two calibration boards and it determines a reference plane defined by the first and second crossing points of each of the at least two calibration boards. The controller also performs a plane transform of the reference frame to obtain a lidar sensor plane and then determines from the lidar sensor plane a pose of the lidar sensor.

In one or more embodiments, the following features may be included. Each of the at least two calibration boards may comprise a main section having a top, a bottom, and first and second legs; wherein each of the at least two calibration boards may further comprise two wing sections, one affixed to each leg of the main section at an angle such that the wing sections and the main section are not co-planar. The main sections may be triangular in shape and the wing sections may be rectangular in shape. Each triangle section may be a right triangle. Each calibration board may be attached to a baseboard. The main sections of each of the at least two calibration boards may be parallel and the wing sections of each of the at least two calibration boards may be parallel. A first calibration board of the at least two calibration boards may be affixed to a front side edge of the baseboard and a second calibration board of the at least two calibration boards may be affixed to a far side edge of the baseboard, opposite the near side edge; wherein the first and second calibration boards are offset along their respective edges so as to not occlude the other when the lidar scan is directed at the calibration boards. The first calibration board may be attached to the baseboard at its top and the second calibration board may be attached to the baseboard at its bottom. The first edge of each of the calibration boards may be at the intersection of the first leg of the main section and one of the wing sections and the second edge of the each of the calibration boards may be at the intersection of the second leg of the main section and the other of the wing sections.

In accordance with another embodiment of the disclosure, there is included a method for determining a pose of a lidar sensor in an environment in order to calibrate the lidar sensor. The method includes providing at least two calibration boards, each calibration board having a first edge and a second edge and causing the lidar sensor to direct a lidar scan at the calibration boards to cross the first and second edges of each of the at least two calibration boards. The method also includes causing the lidar sensor to receive a reflection of the lidar scan from the calibration boards. Responsive to the reflection of the lidar scan, the method also includes determining locations of a first crossing point on the first edge and a second crossing point on the second edge of each of the at least two calibration boards. The method further includes determining a reference plane defined by the first and second crossing points of each of the at least two calibration boards and performing a plane transform of the reference frame to obtain a lidar sensor plane. And, the method includes determining from the lidar sensor plane a pose of the lidar sensor.

In one or more embodiments, the following features may be included. Each of the at least two calibration boards may comprise a main section having a top, a bottom, and first and second legs; wherein each of the at least two calibration boards may further comprise two wing sections, one affixed to each leg of the main section at an angle such that the wing sections and the main section are not co-planar. The main sections may be triangular in shape and the wing sections may be rectangular in shape. Each triangle section may be a right triangle. Each calibration board may be attached to a baseboard. The main sections of each of the at least two calibration boards may be parallel and the wing sections of each of the at least two calibration boards may be parallel. A first calibration board of the at least two calibration boards may be affixed to a front side edge of the baseboard and a second calibration board of the at least two calibration boards may be affixed to a far side edge of the baseboard, opposite the near side edge; wherein the first and second calibration boards are offset along their respective edges so as to not occlude the other when the lidar scan is directed at the calibration boards. The first calibration board may attached to the baseboard at its top and the second calibration board may be attached to the baseboard at its bottom. The first edge of each of the calibration boards may be at the intersection of the first leg of the main section and one of the wing sections and the second edge of the each of the calibration boards may be at the intersection of the second leg of the main section and the other of the wing sections.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" is group having at least one member.

A "read line" or "scan line" a line across the calibration board where the lidar scan impinges upon and across the calibration board.

Figure 1A:
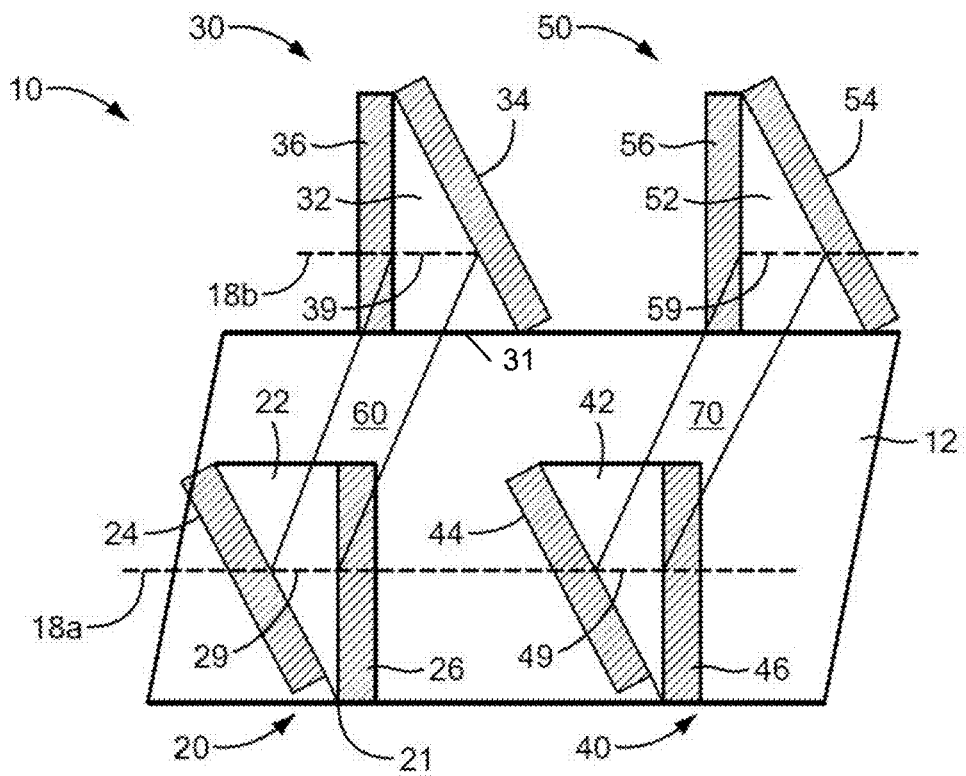
FIG. 1A is a perspective view of a lidar sensor mounted on a vehicle and an embodiment of the calibration device according to an aspect of this disclosure.
Figure 1A:
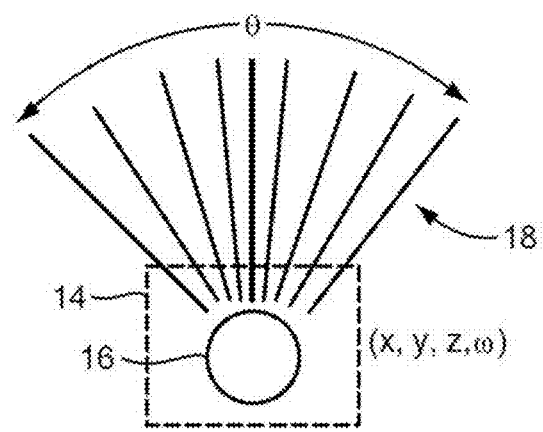

A "crossing point" is a location on the calibration board where the read line intersects with an edge of the calibration board Referring to FIG. 1A, a calibration device 10, according to an aspect of this disclosure is depicted. Calibration device 10 includes a baseboard 12, which may be placed on a surface, such as a floor, on which a vehicle 14 is located. The vehicle 14 includes a lidar sensor 16, which emits a laser scan 18 across a scan range or field of view, e. The scan range is product/application dependent and may reach up to 200 degrees. The laser scan 18 forms a scan plane, which may be directed at the calibration device 10. Vehicle 14 and/or lidar sensor 16 may be located at a known position or pose (x,y,z, pitch, yaw, roll). Using the calibration device 10 and the method of this disclosure, a pose of the vehicle and/or lidar sensor may be determined and compared to the known pose. The deviation from the known pose and the determined pose will be used to calibrate the lidar sensor 16. It should be noted that the lidar sensor 16 has six degrees of freedom; namely, three position dimensions (x,y,z) and three rotational degrees of freedom (pitch, roll, and yaw). As can be appreciated, the lidar sensor 16 may readily be moved out of position in one or more of the six degrees of freedom and result in inaccuracies.

Calibration device 10 includes at least one pair of calibration boards, such as calibration boards 20 and 30, which are mounted on and extend from baseboard 12 in a generally perpendicular direction. Calibration board 20 is mounted on the near side edge (i.e. the side closer to lidar sensor 16) of baseboard 12 and calibration board 30 is mounted on the far side edge of baseboard 12. Calibration boards 20 and 30 are offset from each other along their respective near and far side edges so as not to occlude the other when the lidar sensor 16 projects its scan 18. In other words, the lidar scan 18 must be able to scan the full widths of each of calibration boards 20 and 30.

Each calibration board may be formed of three sections; namely, a main section (typically in the form of a right triangle but other types of triangles or even other types of polygons may be used) and two wing sections (typically, rectangular in shape). Calibration board 20 is shown to include a main section 22 in the shape of a triangle and two rectangular wing sections 24 and 26, each wing section extends along a portion of the legs of the main section 22. Calibration board 20 is mounted on baseboard 10 at its top or vertex 21 (i.e. it is in an inverted position). The wing sections 24 and 26 each intersect at a predetermined angle with respect to the legs of the main section 22, as will be described further below.

Figure 1B:
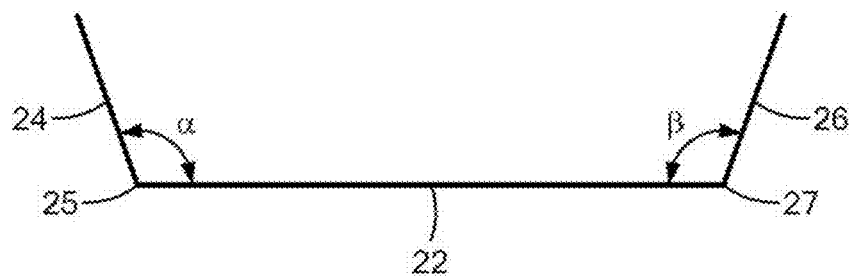
FIG. 1B is a cross-sectional view of a calibration board of the calibration device of FIG. 1A.

The wing sections must not be attached to the main section at a 180 degree angle (i.e. in the same plane as the main section) to allow the lidar sensor 16 to detect the edges formed between the intersection of the main and wing section. Referring to FIG. 1B, a cross-sectional view of calibration board 20 is shown to better depict this. In this view wing section 24 is shown intersecting with main board 22 along edge 25 at an angle α and wing section 26 is shown intersecting main board 22 along edge 27 at an angle β. Angles α and β may be equal but they are not required to be.

The second calibration board 30 in the first pair of calibration boards is shown to be mounted to baseboard 10 at its base 31 and it includes a main section 32 and two wing sections 34 and 36. The wing sections 34 and 36 each intersect at a predetermined angle with respect to the main section 32. Main section 32 of calibration board 30 is oriented parallel to main section 22 of calibration board 20.

In order to improve the accuracy of calibration device 10, one or more additional pairs of calibration boards, such as calibration boards 40 and 50, may be included. As with calibration boards 20 and 30, calibration boards 40 and 50, are mounted on and extend from baseboard 12 in a generally perpendicular direction. Calibration board 40 is mounted on the near side edge of baseboard 12 and calibration board 50 is mounted on the far side edge of baseboard 12. Calibration boards 40 and 50 are also offset from each other along their respective near and far side edges, so as not to occlude the other when the lidar sensor 16 projects its scan 18.

Calibration board 40 is shown to include a main section 42 in the shape of a triangle and two rectangular wing sections 44 and 46, each wing section extending along a portion of the legs of the main section 42. Calibration board 40 is mounted on baseboard 10 at its vertex 41. Calibration board 50 is shown to be mounted to baseboard 10 at its bottom or base 51 and it includes a main section 52 and two wing sections 54 and 56. Main sections 42 and 52 of calibration boards 40 and 50, respectively, are mounted parallel to each other. It should be noted that main sections 42 and 52 are oriented parallel to main sections 22 and 32 of calibration boards 20 and 30, respectively.

Figure 2:
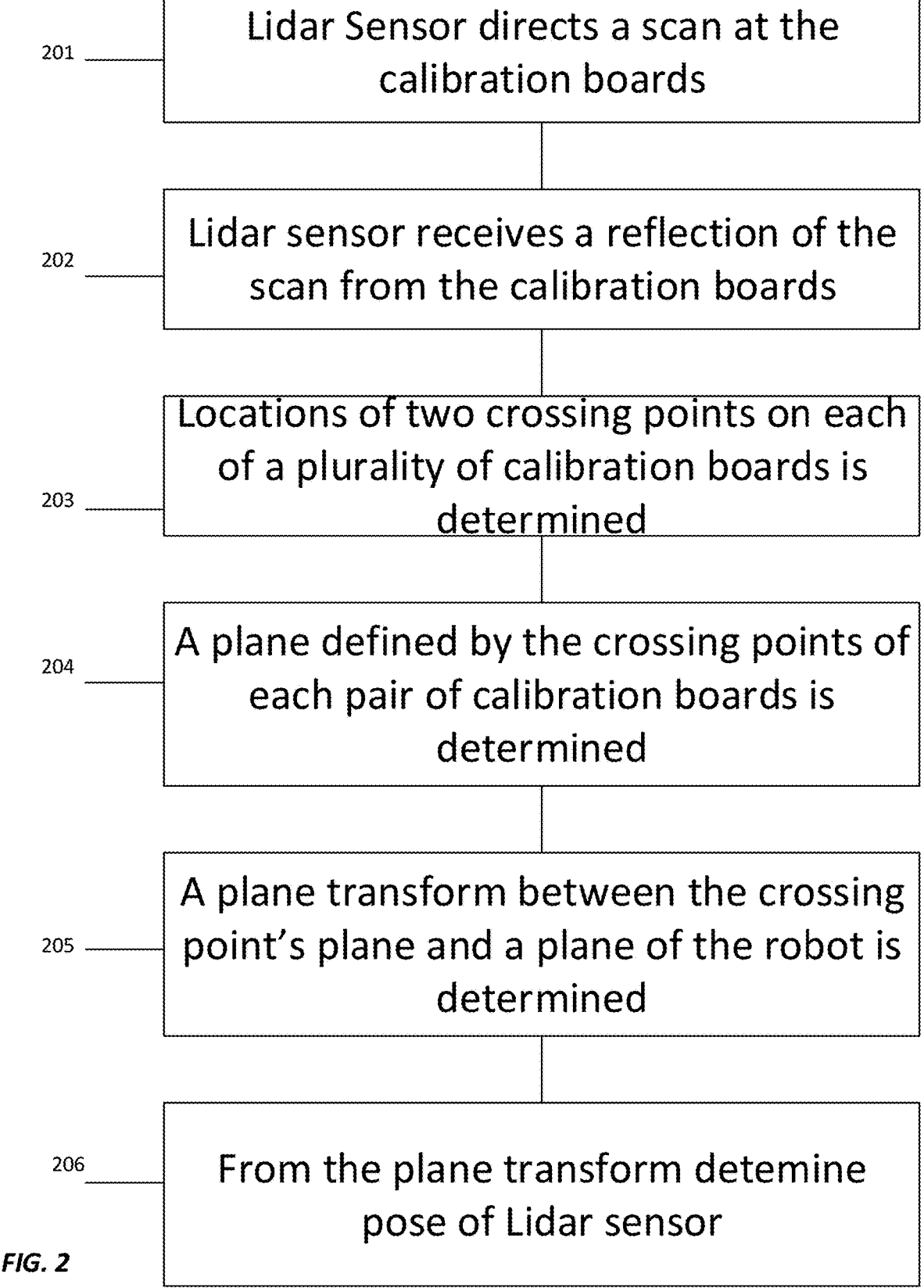
FIG. 2 is a flowchart of the calibration method according to an aspect of this disclosure.
Figure 3:
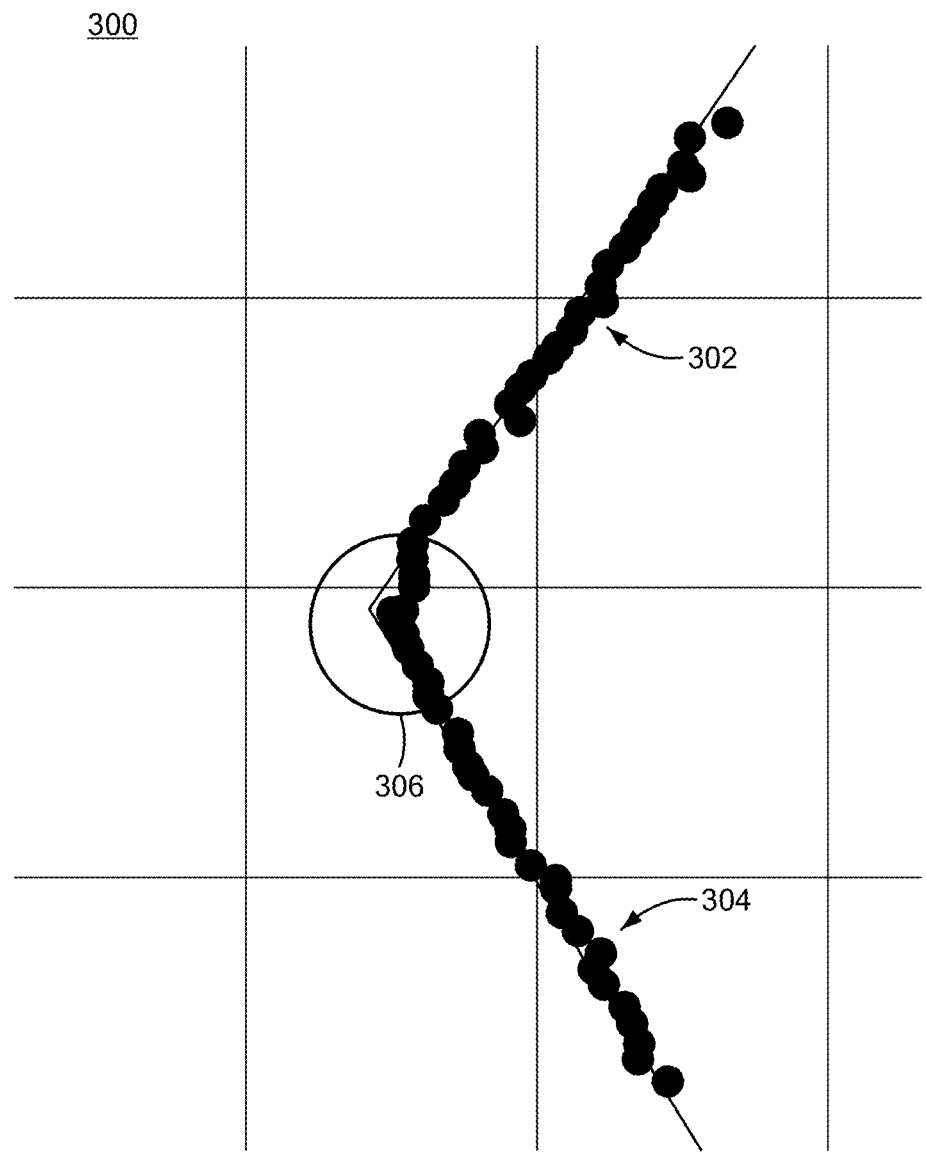
FIG. 3 is a close up view at a point cloud depicting locations of the reflected scan according to aspects of this disclosure.

Referring to FIG. 2 a flowchart 200 for calibrating a lidar sensor is shown. The processes in the flow chart may be performed by a controller. The controller may be a processor, a series of processors, or any other device, which is capable of performing the steps set forth in the flow chart. The processor may be onboard vehicle 14 or it may be part of a separate calibration device (not shown). In step 201 the Lidar sensor directs a scan toward the calibration boards. The scan impinges on and across each of the calibration boards and is reflected back to the lidar sensor, which receives the reflection in step 202. Since the scan is not a continuous, multiple reflection points on the calibration board may be used in aggregate to form a 1-D line or point cloud, a portion of which is depicted in FIG. 3 and described below. Multiple scans may be preferred to assure that a sufficient continuity or resolution for the 1-D line is achieved.

Referring again to FIG. 1A, scan line 18a produced according to steps 201 and 202 of FIG. 2 impinges on and across and is reflected from the calibration boards 20 and 40, on the near side of baseboard 12. Scan line 18b impinges on and across and is reflected from calibration boards 30 and 50, which are on the far side edge of baseboard 12. It should be noted that scan lines 18a and 18b are part of the same scan 18 and result in scan lines 29, 39, 49, and 59, which reflect off main boards 22, 32, 42, and 52 respectively.

Referring back to flow chart 200, FIG. 2, in step 203, the specific locations of the two crossing points on the main sections (22, 32, 42, and 52) of each calibration board (20, 30, 40, and 50, respectively) can be determined based on where the scans are no longer reflected. This is depicted in more detail in FIG. 3 where a point cloud scan 300, comprising scan portions 302 reflected from a main/triangular board and scan portion 304 reflected from a wing board is shown. The crossing point 306 is determined to be the point of discontinuity, i.e. no reflection due to the line crossing. Multiple laser scans may be used to increase accuracy and a line fitting algorithm may be used to reduce noise It is important to get an accurate measurement of each crossing point as the remainder of the calibration process relies on these determinations.

In some embodiments the calibration boards may not have wing sections and thus the furthest point where photons are reflected would be the crossing point. In other embodiments, the change in angle of reflection from the wing section verses the main section would form a crease on which the crossing point is located. The location of the crossing point may be determined by the lidar device itself or from another source such as another measurement device.

In step 204, a calibration plane can be determined from each pair of calibration boards (e.g. 20 and 30 or 40 and 50) by using the crossing points and the known dimensions and angles of the calibration boards. Since the lidar scanner is sending out a 1-D pulses, which form the scan, the crossing points must be co-planar. By connecting scan line crossing points on main section 22 of calibration board 20 with the scan line crossing points of main section 32 of calibration board 30, a first calibration plane 60 may be formed. By connecting scan line crossing points on main section 42 of calibration board 40 with the scan line crossing points of main section 52 of calibration board 50, a second calibration plane 70 may be formed. These calibration planes will be more specifically defined and transformed to determine the plane and pose associated with the lidar sensor, as described below.

In step 205 of flow chart 200, a plane transform is performed on the planes defined by the crossing points in step 204. This step is described in connection with FIG. 4, which, for simplicity, includes just two exemplary main sections 401 and 402 from a pair of calibration boards (not shown). Main sections 401 and 402 include scan lines 404 and 406, comparable to those depicted in FIG. 1A.

Illustratively, main sections 401 and 402 are triangular in shape and may be mounted on a baseboard such that the calibration board including triangular section 401 is on the near side edge of the baseboard and the calibration board including triangular section 402 is on the far side edge of the baseboard. However, this arrangement may be reversed so that the calibration board including triangular section 402 is on the near side edge of the baseboard and triangular section 401 is on the far side edge of the baseboard.

Figure 4:
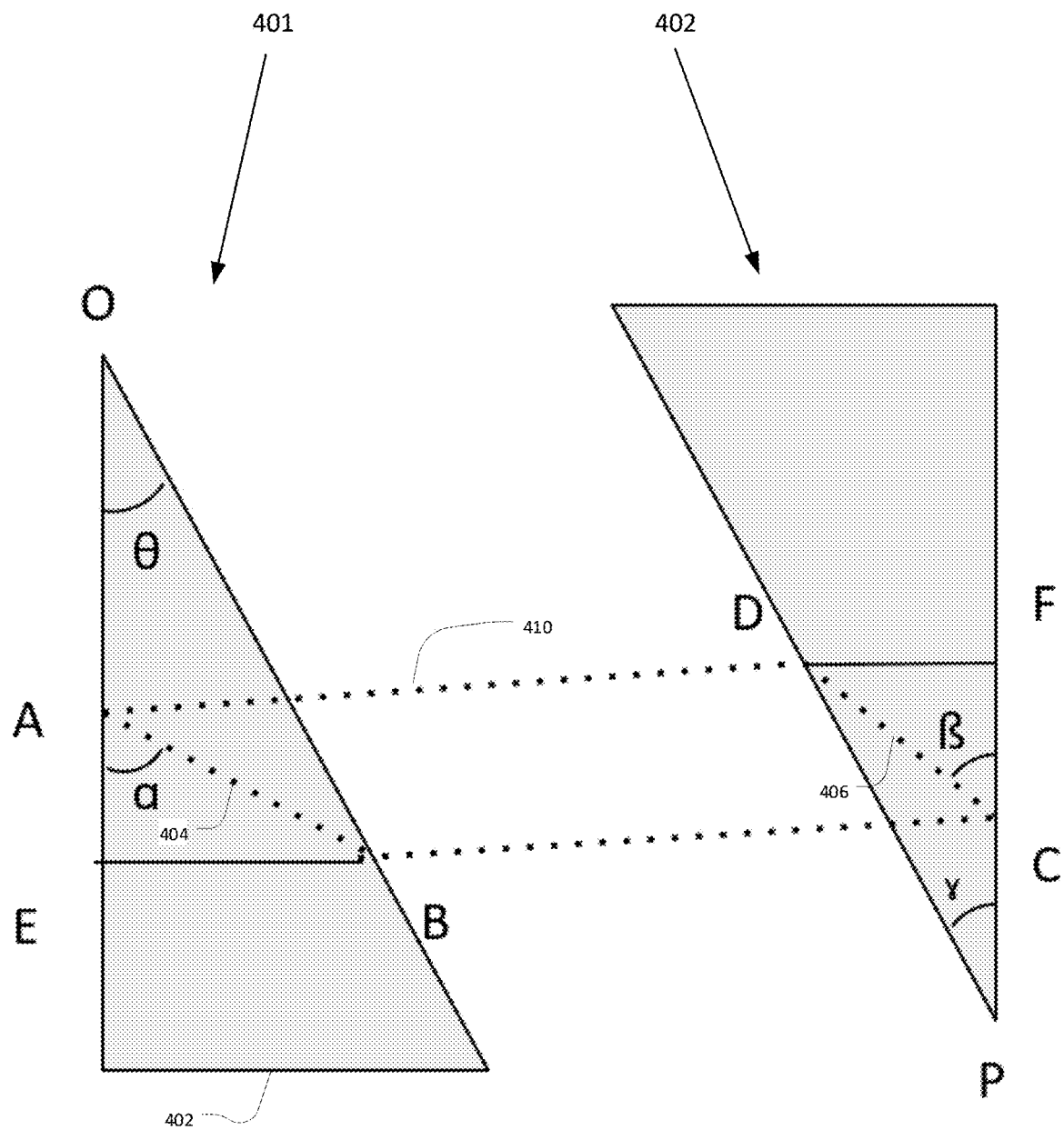
FIG. 4 is a geometric representation of the main sections of the calibration boards according to an aspect of the disclosure

Triangular section 401 includes points A, B, E, and O, and angles $\alpha$ and $\beta$. Triangular section 402 includes points C, D, F, and P, and angles $\beta$ and $\gamma$. Sections 401 and 402 as shown in FIG. 4 are right triangles. However, it is expressly contemplated that they may be other types of triangles or the main sections may be in the shape of other types of polygons. Since the triangular sections are portions of defined calibration boards, their properties are known. Specifically, the locations of points O and P are known, and the angles $\theta$ and $\gamma$ are known.

As described above, when the lidar sensor scans the calibration boards that includes triangular sections 401 and 402, scan lines are formed and defined in the lidar sensor coordinate system as vectors BA and CD, which are parallel segments and are thus located in a plane 410 defined by interconnection points A-D and B-C on the triangular main sections. The triangular sections are mounted on a baseboard such that vectors OA and PF are normal to the baseboard, i.e., they are normal to the floor. In addition, the desired scan angle of the lidar sensor in relation to the ground is known, such that angles $\alpha$ and $\beta$ can be determined as angles between a vector normal to the ground and the scanned parallel lidar segments, assuming that the calibration board is oriented parallel to the normal of the ground.

Parallel vectors BA and CD in the world, or reference, coordinate system can be calculated as a function of the respective angles $\alpha$ and $\beta$. Specifically, since it is known that vector BA is in a plane that is normal to the floor, i.e., vector BA has a z component of zero, the vector BA can be calculated as a function of angle $\alpha$:

$$\begin{pmatrix} f_x(\alpha) \\ f_y(\alpha) \\ 0 \end{pmatrix}$$

Similarly, vector CD can be calculated as a function of angle β:

$$\begin{pmatrix} f_x(\beta) \\ f_y(\beta) \\ 0 \end{pmatrix}$$

Once the angle α is computed, the vector AB can be expressed as a function of a, wherein $f_x(\alpha)$ and $f_y(\alpha)$ are the x and y components of the vector, respectively. Similarly, vector CD can be expressed as a function of β. $f_x(\alpha)$ and $f_y(\alpha)$ and their equivalents for β are coordinates in the reference/world coordinate system. Assuming that the location of the calibration boards in the world coordinate system is known, for example by measurement, these functions can serve as a transform between the lidar sensor coordinate system and the world coordinate system.

To calculate the location of point A on triangular section 401, an additional triangle can be defined by points A, B, and E, as shown in FIG. 4. The additional triangle is a right triangle. Using this additional triangle, the distance OA between points O and A can be calculated as the difference between the distances OE and AE: OA=OE−AE. Because the additional triangle is a right triangle, distances AE and BE can be calculated as:

$$AE = AB*\cos(\alpha)$$

$$BE = AB*\sin(\alpha)$$

This allows calculation of the distance OA as:

$$OA = OE - AE = \frac{BE}{\tan(\alpha)} - AB*\cos(\alpha) = AB*\left(\frac{\sin(\alpha)}{\cos(\alpha)} - \cos(\alpha)\right)$$

Since point A lies in the plane defined by triangular section 401, and since the vector OA is normal to the floor, the location of point A can be calculated from the location of point O, the known direction of vector OA and the distance OA. The location of point B can then be calculated using the location of point A, the vector BA, as calculated above, and the measured length of segment AB. Points C and D on triangular section 402 can be calculated in a similar manner.

Figure 5:
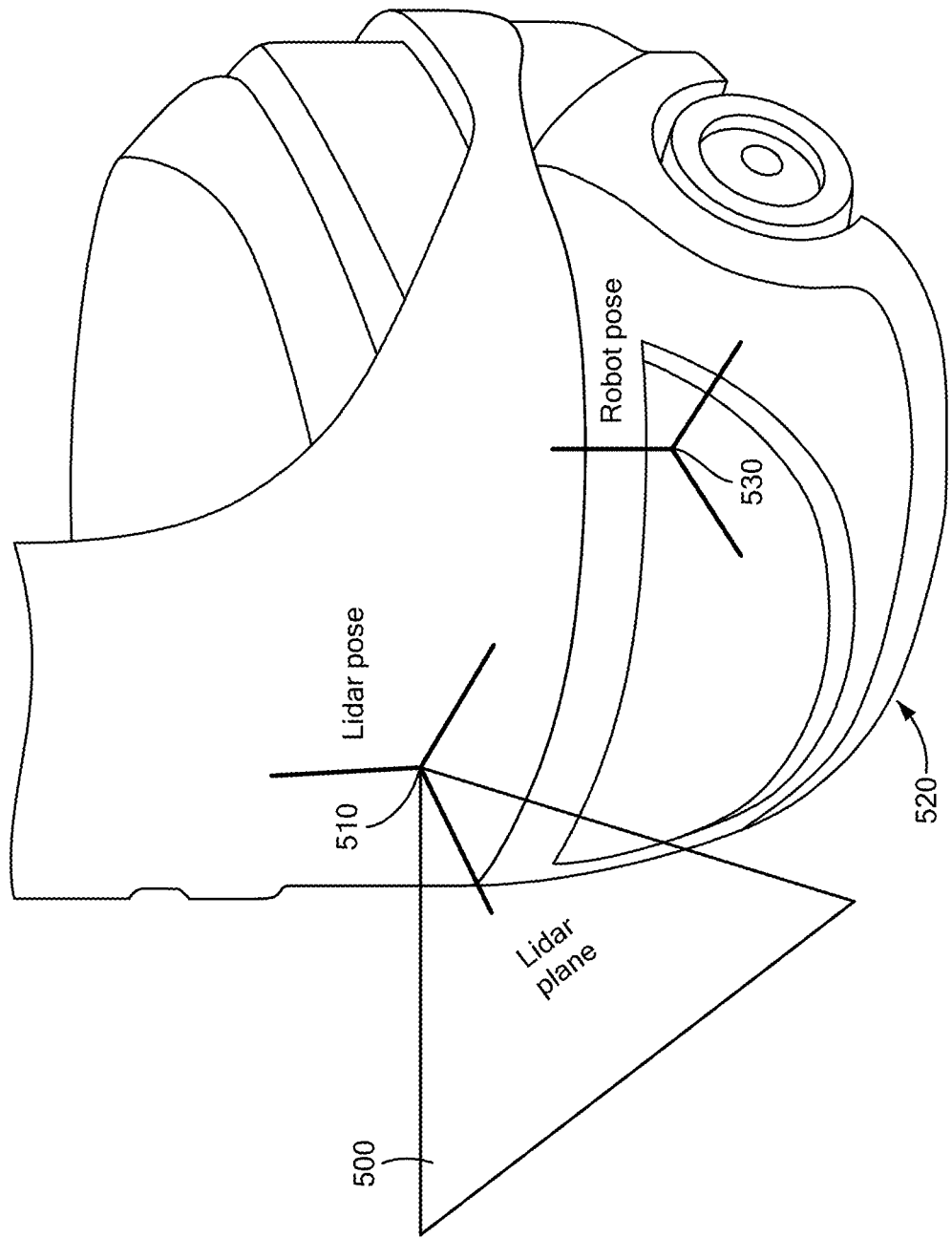
FIG. 5 is a perspective transparent view of a mobile autonomous robot depicting the pose of the robot and the lidar sensor mounted on a vehicle according to an aspect of this disclosure.

With the known points A, B, C, and D, plane 410 can be defined in the world, or reference, coordinate system. Similarly, a corresponding lidar plane, LP, can be defined in the lidar sensor coordinate system. The lidar plane 500 is depicted in FIG. 5 relative to the pose of the lidar sensor 510, which is mounted on the autonomous mobile robot 520. The pose of the robot 530 may be obtained from the determined lidar sensor pose 510 and the know position of the robot pose relative to the lidar sensor pose 510. Exemplarily, the point in the lidar sensor coordinate system that corresponds to point B is the start of scanned line segment BA, the point that corresponds to point A is the end of scanned line segment BA, and so forth. Since scanned segments BA and CD are parallel, they define the plane LP.

A homography, i.e., a projection, between planes 410 and LP can be derived from the four points A, B, C, D and their corresponding points in the lidar sensor coordinate system. While four points are sufficient to determine a unique solution, it is expressly contemplated that more corresponding points from both planes 410 and LP may be used to determine the homography. Using more points can lead to an optimized solution that may be determined, for example, using least squares.

The homography or, in other words, the extrinsic lidar sensor calibration matrix, can therefore be computed using at least four points A, B, C, and D and their corresponding points in lidar sensor coordinate space. Assuming that point A in the reference, or world, coordinate system has coordinates x and y and that its corresponding point in the lidar sensor coordinate system has coordinates u and v, the homography can be determined as follows:

$$\begin{pmatrix} x \\ y \\ 0 \end{pmatrix} = \begin{pmatrix} R_{00} & R_{01} & R_{02} & T_x \\ R_{10} & R_{11} & R_{12} & T_y \\ R_{20} & R_{21} & R_{22} & T_z \end{pmatrix} \begin{pmatrix} u \\ v \\ 0 \\ 1 \end{pmatrix}$$

Because the four points A, B, C, and D in world coordinate plane 410 and their corresponding points in lidar coordinate plane LP are coplanar, the value of the z coordinate is 0. The matrix coefficients labeled R refer to rotational elements, and the coefficients labeled T refer to translational elements of the matrix. As can be seen, each pair of points, such as point A and its corresponding point in the lidar coordinate system, can be used to form two linear equations. Solving the linear equations for all four points and their corresponding points leads to the homography matrix H:

$$\begin{pmatrix} x \\ y \\ 0 \end{pmatrix} = H \begin{pmatrix} u \\ v \\ 1 \end{pmatrix} = \begin{pmatrix} h_{11} & h_{12} & h_{13} \\ h_{21} & h_{22} & h_{23} \\ h_{31} & h_{32} & h_{33} \end{pmatrix} \begin{pmatrix} u \\ v \\ 1 \end{pmatrix}$$

The homography matrix H together with the known lidar sensor intrinsic matrix K can now be used to determine the pose of the lidar sensor, as indicated in step 206, FIG. 2, of flow chart 200. To this end, the homography matrix H is multiplied with the inverse of the intrinsic matrix K. The resulting matrix can be simplified to a 3×3 matrix that includes two rotation vectors and one translation vector:

$$K^{-1}H = K^{-1}\begin{pmatrix} h_{11} & h_{12} & h_{13} \\ h_{21} & h_{22} & h_{23} \\ h_{31} & h_{32} & h_{33} \end{pmatrix} = \begin{pmatrix} r_{11} & r_{12} & t_x \\ r_{21} & r_{22} & t_y \\ r_{31} & r_{32} & t_z \end{pmatrix}$$

In the resulting simplified matrix, the first two columns denote two orthogonal rotation vectors, and the third column denotes a translation vector. If a third rotation vector is needed, it can be computed as the cross product of the two orthogonal rotation vectors. The resulting set of rotation and translation vectors defines the pose of the lidar sensor. The determined pose of the lidar sensor may be used to calibrate the lidar sensor by comparing it to the know pose of the vehicle/lidar sensor which is based on the known positioning of the vehicle in the environment, as shown in FIG. 1A, by using known calibration techniques. Alternatively, the known or manually measured pose may simply be ignored and the calibrated pose may be used as the final pose.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system for determining a pose of a lidar sensor in an environment in order to calibrate the lidar sensor, the system comprising:
   at least two calibration boards, each calibration board having a first edge and a second edge;
   a controller, coupled to the lidar sensor, and configured to:
      cause the lidar sensor to direct a lidar scan at the calibration boards to cross the first and second edges of each of the at least two calibration boards;
      cause the lidar sensor to receive a reflection of the lidar scan from the calibration boards;
      responsive to the reflection of the lidar scan, determine locations of a first crossing point on the first edge and a second crossing point on the second edge of each of the at least two calibration boards;
      determine a reference plane defined by the first and second crossing points of each of the at least two calibration boards;
      perform a plane transform of the reference plane to obtain a lidar sensor plane; and
      determine from the lidar sensor plane a pose of the lidar sensor.

2. The system of claim 1 wherein each of the at least two calibration boards comprise a main section having a top, a bottom, and first and second legs; wherein each of the at least two calibration boards further comprise two wing sections, one affixed to each leg of the main section at an angle such that the wing sections and the main section are not co-planar.

3. The system of claim 2 wherein the main sections are triangular in shape and the wing sections are rectangular in shape.

4. The system of claim 3 wherein each triangle section is a right triangle.

5. The system of claim 2 wherein each calibration board is attached to a baseboard.

6. The system of claim 5 wherein the main sections of each of the at least two calibration boards are parallel and the wing sections of each of the at least two calibration boards are parallel.

7. The system of claim 6 wherein a first calibration board of the at least two calibration boards is affixed to a front side edge of the baseboard and a second calibration board of the at least two calibration boards is affixed to a far side edge of the baseboard, opposite the front side edge; wherein the front side edge is closer to the lidar than the far side edge; and wherein the first and second calibration boards are offset along their respective edges so as to not occlude the other when the lidar scan is directed at the calibration boards.

8. The system of claim 7 wherein the first calibration board is attached to the baseboard at its top, which corresponds to the top of its main section, and the second calibration board is attached to the baseboard at its bottom, which corresponds to the bottom of its main section.

9. The system of claim 2 wherein the first edge of each of the calibration boards is at the intersection of the first leg of the main section and one of the wing sections and the second edge of the each of the calibration boards is at the intersection of the second leg of the main section and the other of the wing sections.

10. A method for determining a pose of a lidar sensor in an environment in order to calibrate the lidar sensor, the method comprising:
    providing at least two calibration boards, each calibration board having a first edge and a second edge;
    causing the lidar sensor to direct a lidar scan at the calibration boards to cross the first and second edges of each of the at least two calibration boards;
    causing the lidar sensor to receive a reflection of the lidar scan from the calibration boards;
    responsive to the reflection of the lidar scan, determining locations of a first crossing point on the first edge and a second crossing point on the second edge of each of the at least two calibration boards;
    determining a reference plane defined by the first and second crossing points of each of the at least two calibration boards;
    performing a plane transform of the reference plane to obtain a lidar sensor plane; and
    determining from the lidar sensor plane a pose of the lidar sensor.

11. Method of claim 10 wherein each of the at least two calibration boards comprise a main section having a top, a bottom, and first and second legs; wherein each of the at least two calibration boards further comprise two wing sections, one affixed to each leg of the main section at an angle such that the wing sections and the main section are not co-planar.

12. The method of claim 11 wherein the main sections are triangular in shape and the wing sections are rectangular in shape.

13. The method of claim 12 wherein each triangle section is a right triangle.

14. The method of claim 11 wherein each calibration board is attached to a baseboard.

15. The method of claim 14 wherein the main sections of each of the at least two calibration boards are parallel and the wing sections of each of the at least two calibration boards are parallel.

16. The method of claim 15 wherein a first calibration board of the at least two calibration boards is affixed to a front side edge of the baseboard and a second calibration board of the at least two calibration boards is affixed to a far side edge of the baseboard, opposite the front side edge; wherein the front side edge is closer to the lidar than the far side edge; and wherein the first and second calibration boards are offset along their respective edges so as to not occlude the other when the lidar scan is directed at the calibration boards.

17. The method of claim 16 wherein the first calibration board is attached to the baseboard at its top, which corresponds to the top of its main section, and the second calibration board is attached to the baseboard at its bottom, which corresponds to the bottom of its main section.

18. The method of claim 11 wherein the first edge of each of the calibration boards is at the intersection of the first leg of the main section and one of the wing sections and the second edge of the each of the calibration boards is at the intersection of the second leg of the main section and the other of the wing sections.

\* \* \* \* \*